United States Patent
Kasztenny et al.

(10) Patent No.: US 12,308,635 B2
(45) Date of Patent: May 20, 2025

(54) UNBALANCE PROTECTION FOR SHUNT CAPACITOR BANKS

(71) Applicant: Schweitzer Engineering Laboratories, Inc., Pullman, WA (US)

(72) Inventors: Bogdan Z. Kasztenny, Markham (CA); Satish Samineni, Malvern, PA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 132 days.

(21) Appl. No.: 18/355,560

(22) Filed: Jul. 20, 2023

(65) Prior Publication Data

US 2024/0039272 A1    Feb. 1, 2024

Related U.S. Application Data

(60) Provisional application No. 63/370,017, filed on Aug. 1, 2022.

(51) Int. Cl.
   *H02H 7/16* (2006.01)
   *H02H 1/00* (2006.01)

(52) U.S. Cl.
   CPC .......... *H02H 7/16* (2013.01); *H02H 1/0092* (2013.01)

(58) Field of Classification Search
   CPC .......... H02H 7/16; H02H 7/18; H02H 7/1252; H02H 1/0092; H02H 1/06
   See application file for complete search history.

(56) References Cited

U.S. PATENT DOCUMENTS

| | | | |
|---|---|---|---|
| 3,477,024 A | 11/1969 | Pelta | |
| 3,626,281 A | 12/1971 | Souillard | |
| 3,859,564 A | 1/1975 | Zulaski | |
| 3,909,672 A | 9/1975 | Lundquist | |
| 5,428,549 A | 6/1995 | Chen | |
| 5,515,227 A | 5/1996 | Roberts | |
| 6,518,767 B1 | 2/2003 | Roberts | |
| 6,525,543 B1 | 2/2003 | Roberts | |
| 6,721,671 B2 | 4/2004 | Roberts | |
| 6,760,670 B2 | 7/2004 | Stoupis | |

(Continued)

OTHER PUBLICATIONS

B. Kasztenny, J. Schaefer, E. Clark "Fundamentals of Adaptive Protective of Large Capacitor Banks- Accurate Methods for Canceling Inherent Bank Unbalances" 2007 60th Annual Conference for Protective Relay Engineers, IEEE, Mar. 2007.

J. Schaefer, S. Samineni, C. Labuschagne, S. Chase, D. Hawaz "Minimizing Capacitor Bank Outage Time Through Fault Location" 2014 67th Annual Conference for Protective Relay Engineers, IEEE, Mar. 2014.

(Continued)

*Primary Examiner* — Nguyen Tran
(74) *Attorney, Agent, or Firm* — Richard M. Edge

(57) ABSTRACT

Protection of shunt capacitor banks in electric power delivery systems using protection settings determined by the protection device or an independent system using capacitor bank arrangement data is described herein. Capacitor bank arrangement data may be entered into an intelligent electronic device (IED). The IED may determine protection settings for the capacitor bank arrangement and for fail-open and fail-short scenarios using the arrangement data. The protection settings may be loaded into a protection element, which applies protection using signals from the power system. Upon detection of an unbalance condition, the IED may effect a protective action by opening a circuit breaker to disconnect the capacitor bank from the power system.

22 Claims, 8 Drawing Sheets

(56) References Cited

U.S. PATENT DOCUMENTS

| | | |
|---|---|---|
| 6,785,105 B2 | 8/2004 | Roberts |
| 6,919,717 B2 | 7/2005 | Ghassemi |
| 6,934,654 B2 | 8/2005 | Benmouyal |
| 7,345,488 B2 | 3/2008 | Fischer |
| 7,616,005 B2 | 11/2009 | Kalyuzhny |
| 8,575,941 B2 | 11/2013 | Samineni |
| 11,592,498 B2 | 2/2023 | Hawaz |
| 2004/0021995 A1 | 2/2004 | Roberts |
| 2005/0243491 A1 | 11/2005 | Tanis |
| 2005/0275397 A1 | 12/2005 | Lightbody |
| 2008/0007230 A1 | 1/2008 | Kalyuzhny |
| 2008/0109205 A1 | 5/2008 | Nasle |
| 2008/0291593 A1 | 11/2008 | Day |
| 2008/0291708 A1 | 11/2008 | Teichmann |
| 2009/0073726 A1 | 3/2009 | Babcock |
| 2021/0102985 A1* | 4/2021 | Hao ............ H02H 7/16 |
| 2021/0167590 A1* | 6/2021 | Schweitzer, III ....... H02J 9/068 |
| 2021/0210950 A1* | 7/2021 | A ............ H02H 7/16 |
| 2022/0107368 A1 | 4/2022 | Hawaz |

OTHER PUBLICATIONS

Dhillon, Malkiat S., Demetrios A. Tziouvaras, Protection of Fuseless Capacitor Banks Using Digital Relays, http://www.selinc.com/techpprs/fuseless_capacitors.pfd, Oct. 11, 1999.

SCHWEITZER,III, Edmund O., Jolene Schafman, Unified Shunt Capacitor Bank Control and Protection, http://www.selinc.com/techpprs/6055.pdf, May 1, 1991.

Brunello, Gustavo, Bofdan Kasztenny, Craig Wester, Shunt Capacitor Bank Fundamentals and Protection, 2003 Conference for Protective Relay Engineers—Texas A&M University, College Station, TX, Apr. 3, 2003.

Fleming, Bill, Negative-Sequence Impedance Directional Element, https://www.selinc.com/WorkArea/DownloadAsset.aspx?id=2475, Jun. 20, 2005.

Calero, Fernando, Rebirth of Negative-Sequence Quantities in Protective Relaying With Microprocessor-Based Relays, https://www.selinc.com/WorkArea/DownloadAsset.aspx?id=2805, Jun. 25, 2005.

* cited by examiner

UNBALANCE PROTECTION FOR SHUNT CAPACITOR BANKS

RELATED APPLICATION

This application claims priority from and benefit of U.S. Provisional Application Ser. No. 63/370,017 filed on 1 Aug. 2022 entitled "Simplifying and Improving Unbalance Protection for Shunt Capacitor Banks" naming Bogdan Kasztenny and Satish Samineni as inventors, which is hereby incorporated by reference in its entirety for all purposes.

TECHNICAL FIELD

This disclosure relates to unbalance protection for shunt capacitor banks of electric power delivery systems. More particularly, this disclosure relates to systems and methods for a device to determine capacitor bank protection settings as well as improving sensitivity and security of capacitor bank unbalance protection schemes.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
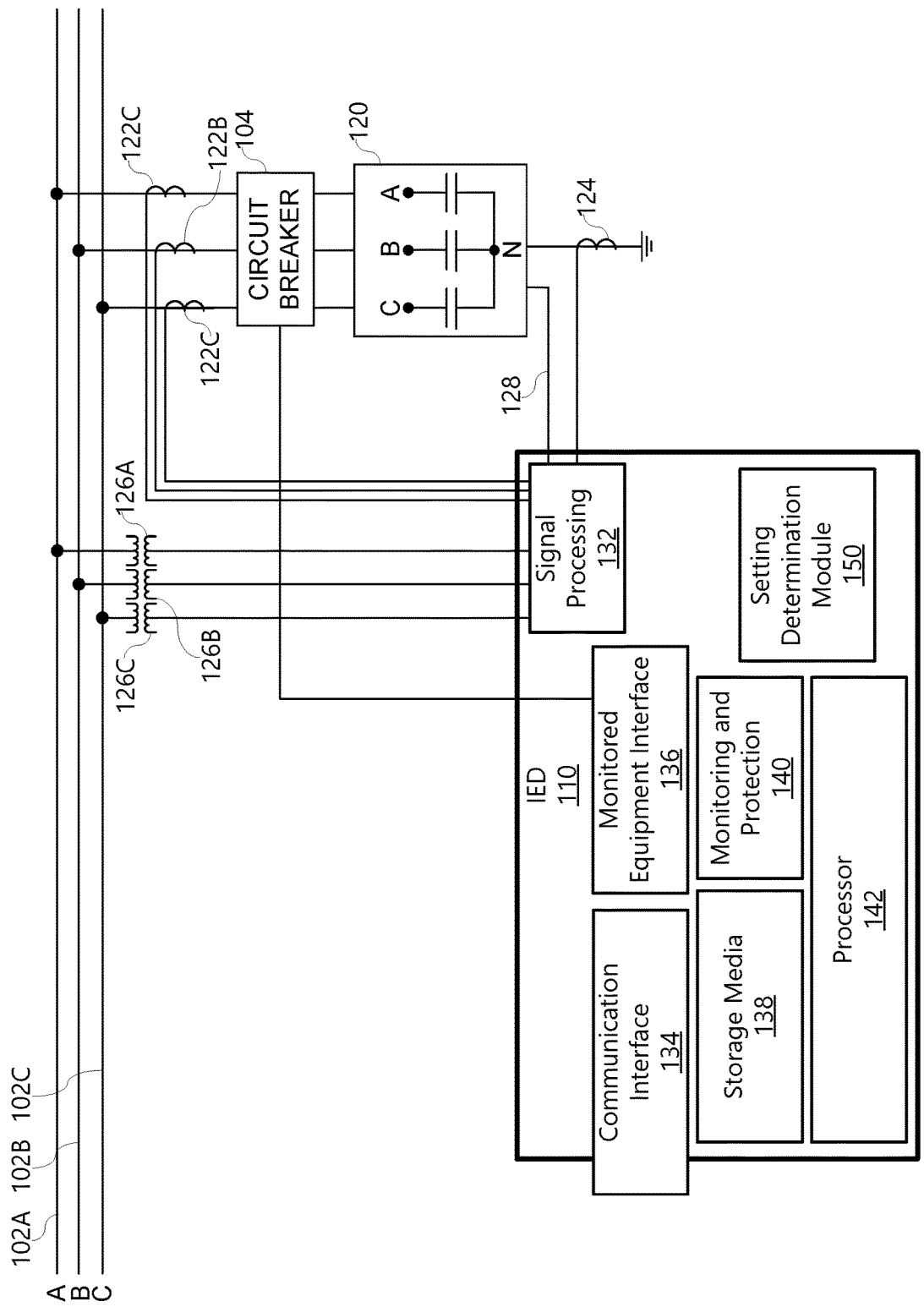
FIG. 1 illustrates a one-line diagram of an electrical power delivery system comprising an Intelligent Electronic Device (IED) implementing shunt capacitor bank protection and control in accordance with several embodiments herein.

Electric power delivery systems include a multiplicity of components for the delivery of electric power from generation facilities to loads. Capacitor banks may be used to help maintain voltage and power factor of the electric power delivery system within acceptable limits.

Shunt capacitor banks are typically assembled from capacitor units connected in parallel to form groups, groups connected in series to form strings, and strings connected in parallel to form phases. In high-voltage applications, the phases are connected as grounded or ungrounded single-wye, double-wye, or H-bridge bank configurations. Capacitor units, in turn, are fabricated from capacitor elements encased together and connected in parallel-series structures. Fuses may be applied to address failures of capacitor elements (internally fused banks) or units (externally fused banks).

Overall, capacitor banks are protected by a combination of fuses (remove the failed unit or element) and protective relays (alarm and trip the bank offline). From the perspective of a protection element, a capacitor failure, and the resulting fuse operation (if fuses are used) blend together into a single event to be detected (alarm for failures that can be tolerated and trip for failures that may progress catastrophically).

A failure of a single or a few capacitor units causes only slight changes in the bank voltages and currents. Therefore, these failures cannot be reliably detected based on the levels of voltages and currents but based on the imbalance in voltages and currents relative to a healthy bank (hence the name unbalance protection). A distinct set of unbalance protection elements is available for each bank configuration.

To set the unbalance protection elements, fault calculations must be performed for failures inside the capacitor bank (capacitor units or elements failing open or short). Because capacitor bank equations are linear and there is no mutual coupling inside the bank, the underlying equations for the calculations are simple: The unit reactance ties the unit voltage and current while Kirchhoff's laws tie all voltages and currents inside the bank. However, solving these underlying equations by hand is tedious.

In general, short-circuit programs may be used to set protection elements such as distance or overcurrent. However, the commonly used short-circuit programs do not typically include modules for unbalance calculations in capacitor banks. Often, about a dozen calculation steps are required to obtain an unbalance protection element operating signal for a particular failure. Some users develop their own short-circuit programs for unbalance calculations in capacitor banks. Developing and validating these specialized short-circuit programs is time consuming.

The embodiments disclosed herein fill this void and provide equations for unbalance calculations for common bank configurations, fusing methods, and unbalance protection elements. These equations allow direct (one-step) calculation because they directly tie the unbalance protection operating signals to the capacitor unit arrangement parameters and the size (number of failed units), type (fail-open or fail-short), and location (below or above the bridge, left or right half of the bank, phase A, B, or C) of the failure. Avoiding multistep calculations not only reduces time and effort but also eliminates opportunities for errors.

The unbalance protection equations may be configured and used in per-unit values. Unbalance in capacitor bank signals is a result of a difference between the faulted and healthy parts of the bank. As such, the per-unit voltage or current unbalance is independent of the absolute characteristics of the faulted and healthy parts such as nominal voltage, current, power, or frequency. In per unit, the unbalance is a fractional number: a ratio of two integer numbers that depend on the number of failed capacitor units and the number of units, groups, and strings in the bank.

In several embodiments, an overvoltage factor is used. We define the overvoltage factor as a ratio of the voltage elevated by the failure in the most stressed part of the bank and the normal voltage in that part (alternative methods are possible and can be easily derived from this disclosure). The overvoltage factor is a function of the bank parameters and the size, type, and location of the failure. The overvoltage factor may be used to better understand the impact of a failure on the rest of the bank including the danger of breaching the unit voltage rating and causing a cascading failure. More importantly for the embodiments described herein, the overvoltage factor may be used to set unbalance protection elements. An alarm may be set as a threshold to detect a single unit failure (or even a fractional unit failure because of the failure of some but not all capacitor elements inside the unit). A trip threshold may be set to trip before the internal overvoltage caused by the failure triggers a cascading failure, e.g. before the overvoltage factor exceeds the highest allowable value.

Unlike the numerical solutions (numbers in, numbers out), the analytical equations presented herein directly tie the signals of interest to the failure and bank parameters. As a result, these direct equations allow a multitude of applications and insights.

Accordingly, presented herein are systems and methods to monitor and protect capacitor banks by a device determining protection and alarm settings using capacitor bank attribute data and arrangement data. The settings may include a plurality of operating signal thresholds. Expected relationships between various operating signals may be determined and used to enhance protection functions in terms of sensitivity and security. The embodiments herein facilitate automatic protection settings determinations for a variety of capacitor banks and capacitor bank arrangements.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Several aspects of the embodiments described may be implemented as software modules or components or elements. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions. Software modules or components may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment.

FIG. 1 illustrates a simplified diagram of a portion of an electric power delivery system that includes three phase conductors 102A, 102B, and 102C connectable to a capacitor bank 120 via circuit breaker(s) 104. The system may include various other lines, branches, transformers, loads, and the like, but is illustrated in simplified form for ease of discussion herein. As is described above, the capacitor bank 120 may be selectively connected to the power system for various voltage support applications.

An IED 110 provides electric power system protection that includes monitoring and protection related to the capacitor bank 120 operation. The monitoring and protection may include unbalance protection elements such as, for example, neutral overvoltage (59 NT) for ungrounded banks, neutral overvoltage unbalance (59 NU) for ungrounded banks, voltage differential (87V) for grounded banks and ungrounded banks, neutral overcurrent unbalance (60N) for grounded and ungrounded banks, phase overcurrent unbalance (60 P) for grounded and ungrounded banks, negative-sequence overcurrent (50 Q/50 QT) for grounded and ungrounded banks, and impedance (21C) for grounded banks. IEDs may obtain signals using instrument transformers from the electric power system as well as from within the capacitor bank itself.

The illustrated IED 110 includes a processor 142 for executing computer instructions, which may comprise one or more general purpose processors, special purposes processors, application-specific integrated circuits, programmable logic elements (e.g., FPGAs), or the like. The IED 110 may further comprise non-transitory machine-readable storage media 138, which may include one or more disks, solid-state storage (e.g., Flash memory), optical media, or the like for storing computer instructions, measurements, settings and the like. In various embodiments the storage media 138 may be packaged with the processor 142, separate from the processor 142, or there may be multiple physical storage media 138 including, for example, media packaged with the processor 142 and media 138 separate from the processor 142. The IED 110 may be communicatively coupled to other IEDs and/or supervisory systems either directly or using one or more communication networks via one or more communication interfaces 134. In some embodiments, the IED 110 may include human-machine interface (HMI) components (not shown), such as a display, input devices, and so on.

The IED may include a signal processing module 132 for obtaining signals related to electrical conditions of the electric power delivery system. The signal processing module 132 may be configured to receive secondary signals from instrument transformers such as current transformers (CTs) 122A, 122B, 122C, 124, voltage transformers (VTs) 126A, 126B, 126C and the like, including instrument transformers within the capacitor bank 120 via input 128. Alternatively, signals may be provided from a merging unit. The signal processing module may include hardware and/or software for obtaining such signals and converting such signals for use by the processor 142 to perform monitoring and protection functions. Line currents and voltages may be sampled at a rate suitable for protection, such as in the order of kHz to MHz. An analog-to-digital converter (ADC) may be included to create digital representations of the incoming line current and voltage measurements. The signal processing module 132 may include circuitry for filtering and conditioning such secondary signals. In certain embodiments, the signal processing module may be configured to receive communication signals from merging units or similar devices that obtain power system signals and convert the power system signals to be communicated on communication media to the IED 110. In general, the signal processing module 132 may receive various signals related to power system equipment such as, for example, equipment status (open/closed), temperature, voltage, current, speed, and the like.

The IED 110 may include a plurality of monitoring and protection elements, described as a monitoring and protection module 140 that may be embodied as instructions stored on computer-readable media (such as storage media 138). The instructions, when executed on the processor 142, cause the IED to perform monitoring and protection operations such as unbalance protection and monitoring of the capacitor bank 120 as described above. The IED may execute the instructions to detect an unbalance condition and may also cause the IED to communicate an alarm and/or execute a protective action in response to the detected unbalance condition (e. g. signaling a circuit breaker 104 to open) and the like. Methods disclosed herein may generally follow the instructions stored on media for system protection.

The monitoring and protection module 140 may include various protection elements such neutral overvoltage, neutral overvoltage unbalance, voltage differential, neutral overcurrent unbalance, phase overcurrent unbalance, negative-sequence overcurrent, impedance, and the like. The storage media 138 may include protective action instructions for the IED 110 such as to signal a circuit breaker 104 to open via the monitored equipment interface 136 upon detection of certain unbalance conditions.

The IED 110 may further include a setting determination module 150 for determining settings for various protective functions of the IED 110. In accordance with several embodiments herein, the setting determination module may be embodied as computer instructions for execution by a processing device for determining protection settings and updating the monitoring and protection modules with the determined settings. The settings determination module 150 may be configured to receive user-input capacitor bank attribute data. The attribute data may include information available from the capacitor bank nameplate related to the capacitor bank arrangement, configuration, and ratings. The attribute data may include, for example, the bank configuration, method of fusing, number of parallel capacitor units in a group, the number of series groups in a string, the number of parallel strings, the capacitor unit voltage rating, the capacitor bank nominal voltage, and capacitor bank reactive power. Much of this data (if not all) may be available from the capacitor bank nameplate or project documentation. The data may be entered without the need for interpretation directly from the documentation. The setting determination module 150 may be configured to use the attribute data to determine protection and monitoring settings as described in additional detail below.

Figure 2:
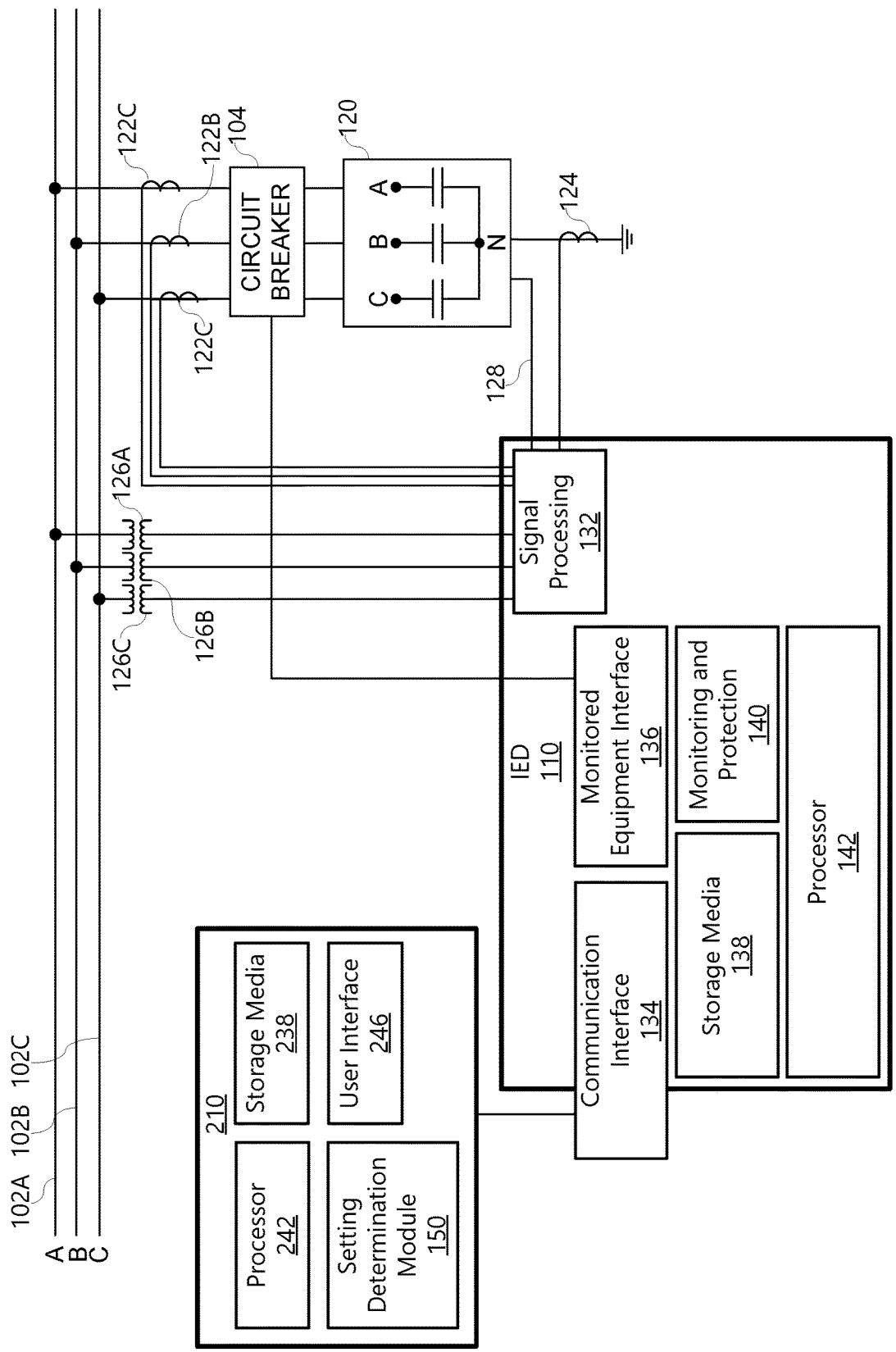
FIG. 2 illustrates a one-line diagram of an electrical power delivery system comprising an IED implementing capacitor bank protection and control using protection settings determined by a separate IED in accordance with several embodiments herein.

In several embodiments, separate device 210 may be used to perform the settings determinations and transmit the settings to the IED 110. FIG. 2 illustrates a system that includes a device 210 for performing the settings determinations using a setting determination module 150. The device 210 may include a processor 242 for executing the computer instructions of the setting determination module 150. The device 210 may include a user interface 246 for receiving the capacitor bank attribute information and displaying (if desired) information to a user. The device 210 may include computer readable media 238 for storing computer instructions such as the setting determination module 150 for execution on the processor 242. The embodiments illustrated in FIGS. 1 and 2 are but two examples of systems for calculating protection and monitoring settings for capacitors in accordance with this disclosure. Other embodiments include, for example, remote calculation and communication of such settings; wireless transmission of the settings; calculation at a central control location and transmission of such settings to various IEDs; and the like.

The embodiments described herein may be applied to various capacitor bank configurations that are used in electric power delivery systems, and the determination of the monitoring and protection settings may be based on the configuration of the capacitor bank to be protected as well as the voltage and current signals from within the bank that are available to the IED 110.

Figure 3A:
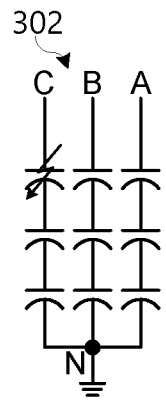
FIGS. 3A, 3B, 3C, 3D, 3E, and 3F illustrate simplified diagrams of typical capacitor bank configurations.
Figure 3B:
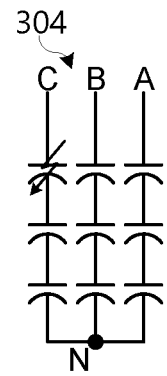
Figure 3C:
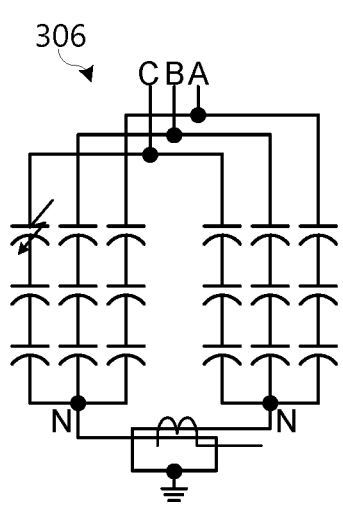
Figure 3C:
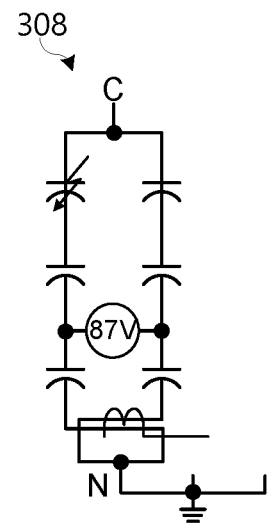
Figure 3D:
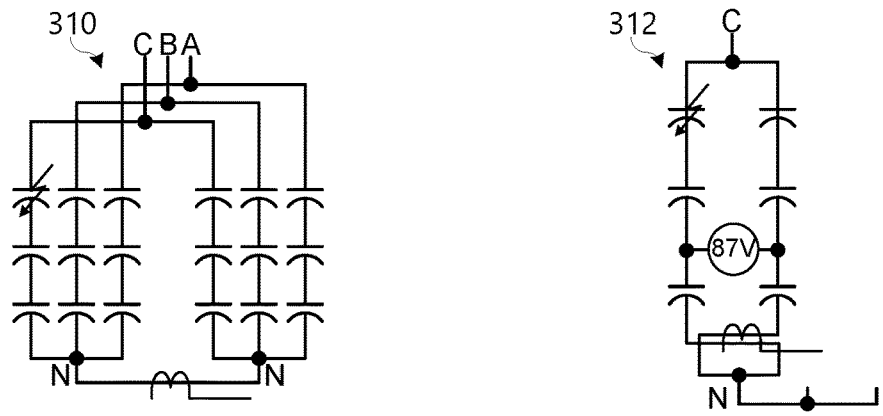
Figure 3E:
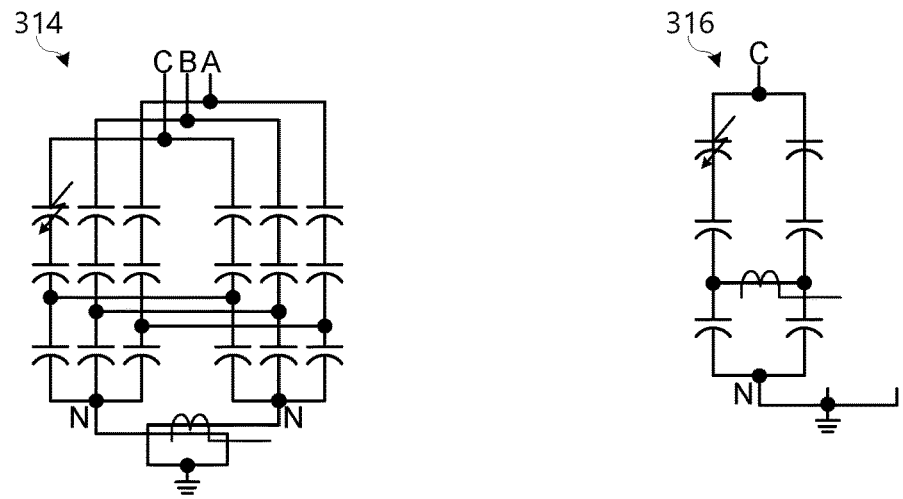
Figure 3F:
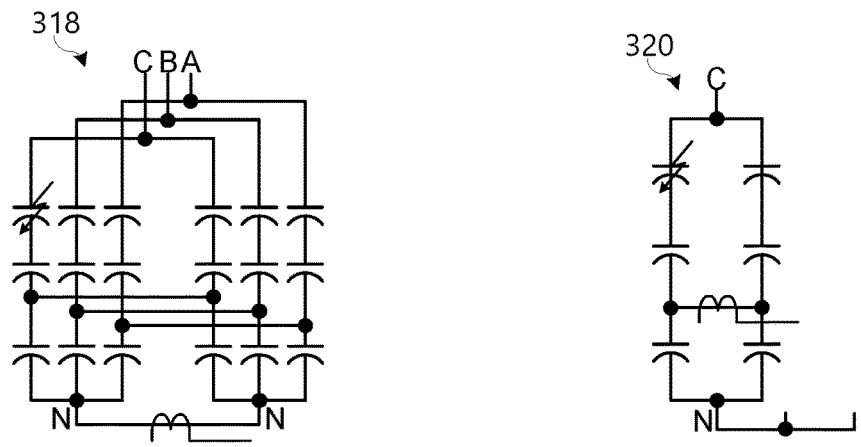

FIGS. 3A through 3F illustrate simplified diagrams of some bank configurations that may be monitored and protected using the settings that are generated by the embodiments described herein. For simplicity, the figures do not show instrument transformers, unless required for clarity. The figures also show a failure location for which the derived unbalance equations directly apply. The term location refers to the faulted phase (A, B, or C), the faulted half of the double bank (left or right) and the fault position with respect to the tap or bridge (above or below). FIGS. 3A and 3B illustrate grounded 302 and ungrounded 304 single-wye bank configurations. FIG. 3C illustrates a grounded double-wye bank configuration 306 and an alternative connection (one phase shown for simplicity) 308 for voltage differential protection. FIG. 3D illustrates an ungrounded double-wye bank configuration 310 and an alternative connection (one phase shown for simplicity) 312 for voltage differential protection. FIG. 3E illustrates a grounded H-bridge bank configuration 314 and a configuration 316 of the bank for voltage differential protection and including an instrument transformer for phase differential unbalance protection (one phase shown for simplicity). FIG. 3F illustrates an ungrounded H-bridge bank configuration 318 and a configuration 320 of the bank including an instrument transformer for phase differential unbalance protection (one phase shown for simplicity).

Figure 4B:
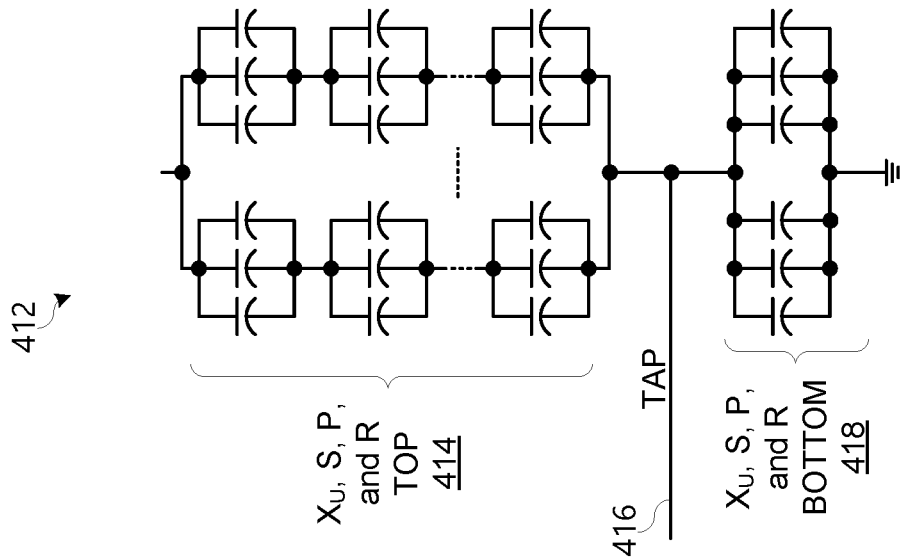
FIGS. 4A and 4B illustrate typical capacitor bank arrangements in groups, strings, and units.
Figure 4A:
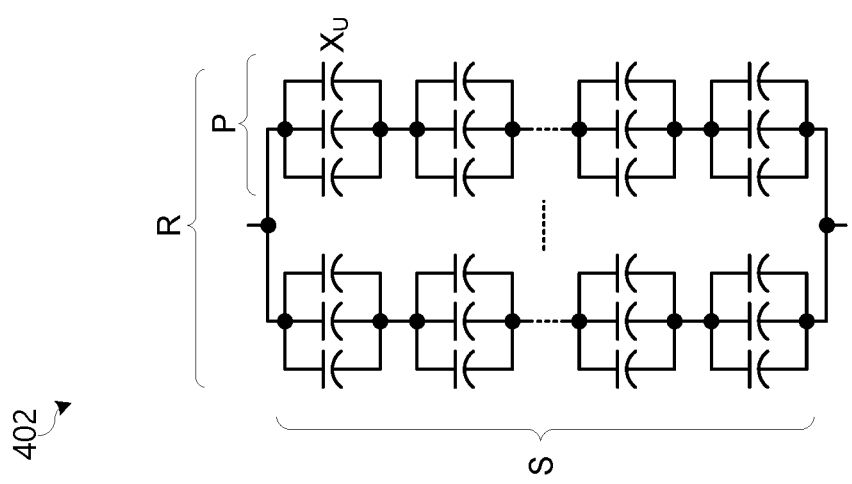

As will be described in more detail below, determination of protection settings may require information related to the capacitor bank arrangement. FIGS. 4A and 4B illustrate single phase general capacitor unit arrangement in a uniform capacitor bank arrangement 402 and in a non-uniform capacitor bank arrangement 412. The capacitor banks are arranged with P capacitor units connected in parallel to form a group. S groups are connected in series to form a string. R strings are connected in parallel to form a phase. In fuseless banks P=1, and in fused banks, R is typically 1 or 2. The reactance of each unit is represented as $X_U$.

Typically, S is much greater than 1 because the unit voltage rating is a relatively small fraction of the system nominal voltage, and several units must be connected in series to match the system voltage. The product of S, R, and P is much greater than 1 to provide the desired rated power given the unit reactive power rating (kVAr). Typically, the sum of R and P is also much greater than 1 to increase bank survivability during unit failures.

The phase reactance (X) is the following function of the capacitor unit reactance ($X_U$) and the bank parameters S, P, and R:

$$X = \frac{S}{P \cdot R} \cdot X_U \qquad \text{Eq. 1}$$

As described above, FIG. 4A illustrates a uniform bank arrangement. Uniform banks may be arranged such that all phases (e.g. A, B, and C) are constructed the same. Furthermore, both halves of a double bank may be constructed the same. Furthermore, in H-Bridge banks, the parts above and below the bridge may be constructed with the same capacitor units and the same P and R parameters, even though the number of groups in series may be different above and below the bridge (the bridge position H may be different than 0.5 pu, in this disclosure S is the total number of groups in series).

When a tap 416 for voltage differential is created, the number, arrangement, and ratings of capacitor units are often different in the parts above and below the tap 416. The per-unit tap position T 416 follow the voltage divider principle, and can be calculated as follows:

$$T = \frac{X_{BOTTOM}}{X_{TOP} + X_{BOTTOM}} \qquad \text{Eq. 2}$$

where $X_{TOP}$ and $X_{BOTTOM}$ are the reactances of the top and bottom parts, respectively. Equation 1 can be used to calculate these reactances.

Several embodiments herein use equivalent bank parameters so that uniform unit arrangements may be used in protection settings calculations. The equivalent number of parallel units in a group, P, is the same as in the top (above the tap) part of the phase. The equivalent number of parallel strings in a phase, R, is the same as in the top (above the tap) part of the phase. The equivalent number of groups $S_{EQ}$ in series in a string is:

$$S_{EQ} = \frac{S_{TOP}}{1 - T} \qquad \text{Eq. 3}$$

Typically, Equation 3 returns the equivalent value of S that is not an integer number. The non-integer value of S does not create any problems in subsequent unbalance calculations and it allows neglecting the differences in unit arrangement in parts above and below the tap.

In several embodiments, calculation of protection settings depends on possible failure scenarios of the capacitor banks. Capacitor banks generally fall into three categories. Externally fused banks where fuses mounted outside each capacitor unit case protect the bank from short circuits inside the units. Internally fused banks where multiple fuses are fabricated inside each capacitor case to protect the capacitor unit from short circuits of the capacitor elements inside the case. Fuseless banks where no fuses are present and the capacitor failures are permanent short circuits.

In general, capacitors may fail open (a short circuit blows the fuse and the faulted capacitance becomes an open circuit) or fail short (no fuse is present and the faulted capacitance remains shorted out). Failure of a single capacitor element or even a few elements does not necessarily result in the loss of the entire capacitor unit. The ability to perform unbalance calculations for a partial unit failure is beneficial to provide information and alarms for operators to take action on such partial unit failures.

Typically, capacitor element failures put the highest voltage stress on the rest of the failed capacitor unit. As a result, the failure progresses first inside the unit, resulting in a complete failure of the unit before the problem spreads to the rest of the capacitor units in the bank.

The fail-open scenario applies to both externally fused banks where operation of the fuse removes the entire unit and internally fused banks when enough internal fuses operate to remove the entire unit. Unbalance protection is concerned with detecting the resulting fail-open state after the fuse operation has removed the shorted unit.

The fail-short scenario applies to fuseless banks in which a short circuit inside of the unit prevails and the unbalance protection is expected to detect the shorted unit(s). this category also applies to externally fused banks if it is desired to perform unbalance calculations at the capacitor element level for scenarios where some elements are shorted by the unit remains in service because the current of the failed unit is below the rated current of the external fuse.

Fail-open and fail-short scenarios may also be used to represent banks that are left unrepaired or are temporarily repaired after a failure. In this application, unbalance equations may be used to calculate the inherent (standing) unbalance before the next failure, as well as to calculate the unbalance protection operating signals for a failure in an inherently unbalanced bank.

Figure 5A:
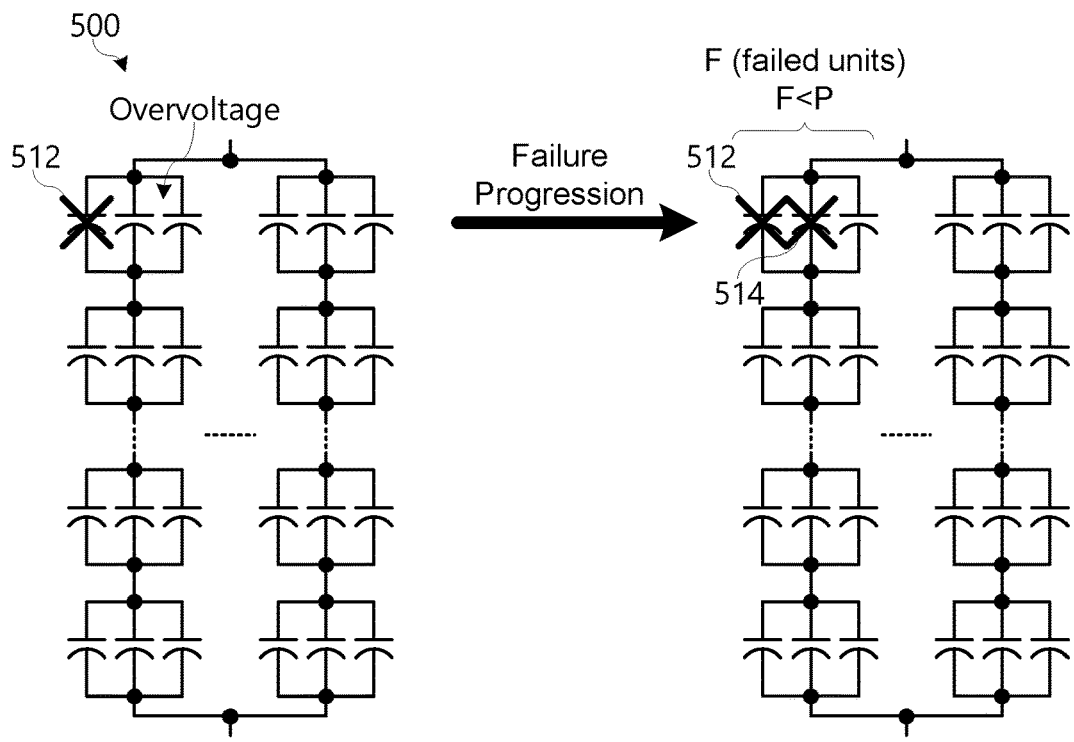
FIGS. 5A and 5B illustrate failure progression in typical fail-open and fail-short scenarios.

FIG. 5A illustrates a simplified diagram of unit failure model for the fail-open scenario of a capacitor bank 500. When the first unit 512 in a group fails open, the other units in the same group are subjected to an overvoltage condition. As a result, it is most likely that the next unit failure 514 will be in the same group. Therefore, in the fail-open scenario, F units in the same group are illustrated to fail open (F<P).

Figure 5B:
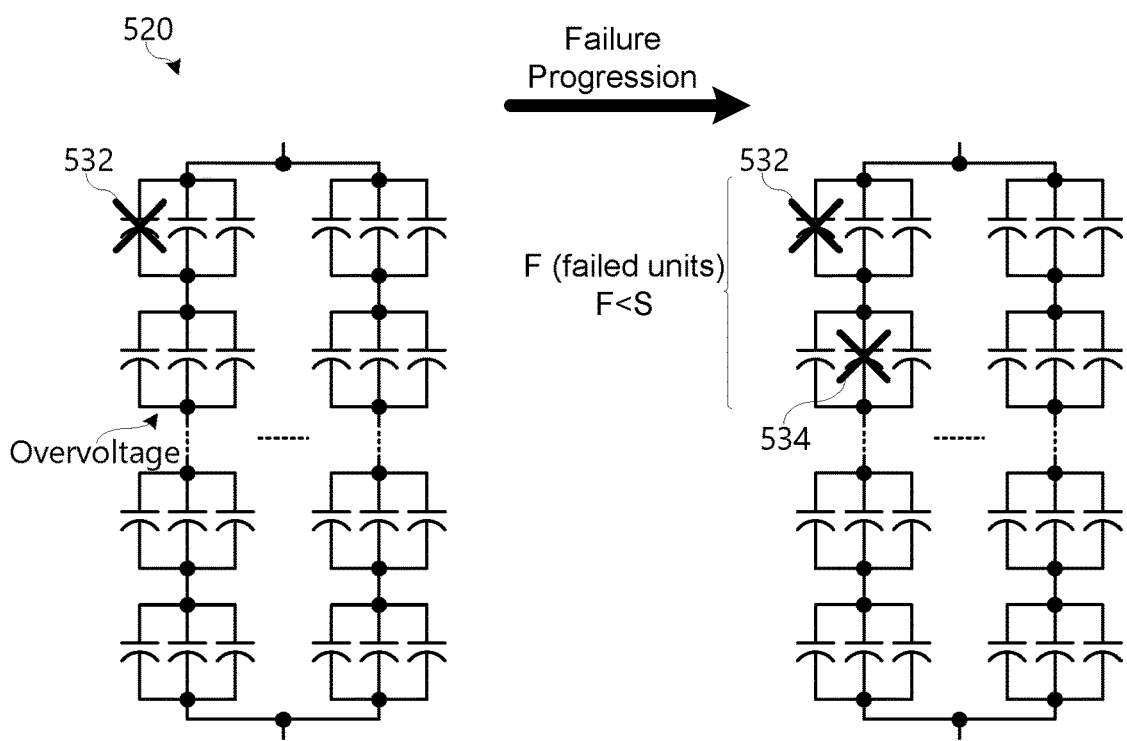

FIG. 5B illustrates a simplified diagram of unit failure model for the fail-short scenario of a capacitor bank 520. When the first unit 532 in a group fails short, the other groups in the same string are subjected to an overvoltage condition. As a result, it is most likely that the next failure 534 will be in a different group of the same string. Therefore, in the fail-short scenario, F groups in the same string are illustrated to fail short (F<S).

In either arrangement, the variable F is used to represent the size of a failure that occurred in a single location as illustrated in FIGS. 5A and 5B. The size of a failure F may be used as described in certain embodiments to perform unbalance calculations for capacitor element failures.

Because equations that tie the capacitor bank voltages and currents are linear, any unit frame may be selected for the capacitor bank calculations. Calculations in per unit of the bank nominal voltage and current yields simple results that are applicable to banks of any voltage ($V_{NOM}$) and reactive power ($Q_{NOM}$) ratings. Equations 4, 5, and 6 may be used to calculate base quantities of base voltage ($V_{BASE}$), base current ($I_{BASE}$), and base reactance ($X_{BASE}$):

$$V_{BASE} = \frac{V_{NOM}}{\sqrt{3}} \qquad \text{Eq. 4}$$

$$I_{BASE} = \frac{Q_{NOM}}{\sqrt{3} \cdot V_{NOM}} = \frac{Q_{NOM}}{3 \cdot V_{BASE}} \qquad \text{Eq. 5}$$

$$X_{BASE} = \frac{V_{BASE}}{I_{BASE}} \qquad \text{Eq. 6}$$

$Q_{NOM}$ is the reactive power that the bank provides under nominal voltage, not the sum of unit power ratings (kVAr) of all the capacitor units in the bank. In double-bank configurations, the base current is the nominal current of the entire bank, not half of the bank.

In a per-unit system, the healthy-phase reactance is 1 pu and the faulted-phase reactance is above or below 1 pu depending on if the units fail open or short. In various embodiments herein, the unbalance calculations in the per-unit frame involve only the failure parameters (F, fail-open, or fail-short) and the capacitor bank arrangement parameters (P, S, R, and H or T).

In one example, an operating signal 59N in accordance with the principles described herein may be calculated for an ungrounded single-wye bank. In this example, per-unit faulted phase reactances for fail-open and fail-short arrangements may be represented as illustrated in Equations 7 and 8, respectively:

$$X_F = R \cdot \frac{S \cdot P - F \cdot (S-1)}{S \cdot R \cdot (P-F) + F \cdot (R-1)} \qquad \text{Eq. 7}$$

-continued $$X_F = R \cdot \frac{S-F}{S \cdot R - F \cdot (R-1)} \qquad \text{Eq. 8}$$

The reactances of Equations 7 and 8 may be used in various unbalance protection operating elements to obtain operating signals. For example, the neutral overvoltage operating signal $V_{59N}$ for fail-open and fail-short scenarios may be calculated using Equations 9 and 10:

$$V_{59N} = \frac{F \cdot 1 \angle 180°}{3 \cdot S \cdot P \cdot R - F \cdot (3 \cdot S \cdot R - 3 \cdot R + 1)} \qquad \text{Eq. 9}$$

$$V_{59N} = \frac{F \cdot 1 \angle 0°}{3 \cdot S \cdot R - F \cdot (3 \cdot R - 1)} \qquad \text{Eq. 10}$$

The phase angles in Equations 9 and 10 are relative to the faulted-phase voltage angle. When a capacitor unit fails open, the $V_{59N}$ signal is out of phase with the faulted-phase voltage. When a capacitor unit fails short, the $V_{59N}$ signal is in phase with the faulted-phase voltage. This angle information may be used when calculating the unbalance protection operating signals for multiple failures in different parts of a bank.

When there is no failure (F=0), the $V_{59N}$ operating signal is zero, as expected. The per-unit $V_{59N}$ signal is a simple function of the bank parameters, S, P, and R, and does not depend on the bank ratings (nominal voltage, nominal reactive power, and nominal frequency). When the units fail short, the $V_{59N}$ signal does not depend on the number of capacitor units in parallel (P).

A failure in a capacitor bank causes an internal overvoltage inside the bank (see FIGS. 5A and 5B). This overvoltage may cause more failures, which in turn creates even higher overvoltage, and eventually, leads to a cascading failure. An overvoltage level may be used to set trip thresholds of the unbalance protection elements. The number of failed units may be used as a proxy of the internal overvoltage. However, the same number of failed units may stress different capacitor banks differently depending on the bank unit arrangement data and the capacitor unit voltage ratings. Embodiments herein may tie protection trip thresholds directly to overvoltage (exact solution) rather than the number of failed units (approximated solution).

Accordingly, an overvoltage factor $k_{OV}$ is introduced as the ratio of the present voltage across a healthy capacitor unit that is most stressed during a failure in the bank and the voltage across the same unit when the nominal system voltage is applied to a healthy bank. For example, when $k_{OV}$=1.15, the voltage across the unit is 1.15 times higher than the normal voltage across the same unit. Overvoltage factor equations may be derived for all six bank configurations and the fail-open and fail-short scenarios. In accordance with several embodiments, the overvoltage factors may be used to set trip thresholds of unbalance protection elements. Systems and methods disclosed herein may calculate the overvoltage factors using the equations with the capacitor arrangement data, and further set trip thresholds for unbalance protection of the capacitor bank.

For example, the overvoltage factor in an ungrounded single-wye bank for the fail-open scenario is shown in Equation 11:

$$k_{OV} = \frac{3 \cdot S \cdot P \cdot R}{3 \cdot S \cdot P \cdot R - F \cdot (3 \cdot S \cdot R - 3 \cdot R + 1)} \qquad \text{Eq. 11}$$

Equation 11 indicates how much internal overvoltage occurs in an ungrounded single-wye bank when F units fail open. Of course, when there is no failure (F=0), the overvoltage factor $k_{OV}$ equals 1, as expected.

Equation 11 may be solved to determine how many units would have to fail open to cause a particular overvoltage, expressed as Equation 12:

$$F = \frac{3 \cdot S \cdot P \cdot R}{3 \cdot S \cdot R - 3 \cdot R + 1} \cdot \frac{k_{OV} - 1}{k_{OV}} \qquad \text{Eq. 12}$$

Equation 12 allows association of the voltage stress in the bank ($k_{OV}$) with the failure size (F) for the fail-open scenario in ungrounded single-wye banks.

The overvoltage factor $k_{OV}$ may be used to set protection elements. For this, the operating signal of an unbalance protection element may be tied to the number of failed units. Because the number of failed units (F) is a function of the overvoltage factor ($k_{OV}$) (for the different failure scenarios of each capacitor bank arrangement), the operating signal for each failure scenario of each capacitor bank arrangement can be determined as a function of the overvoltage factor ($k_{OV}$). For example, Equation 13 provides the 59N element operating signal for the ungrounded single-wye bank as a function of the overvoltage factor:

$$V_{59N} = \frac{k_{OV} - 1}{3 \cdot R \cdot (S-1) + 1} \qquad \text{Eq. 13}$$

Equation 13 is useful because it directly ties the per-unit operating signal of the 59N unbalance protection element with the internal overvoltage in the protected bank during a failure. As is illustrated in the following example, a device (such as an IED) may calculate protection element thresholds and alarm thresholds by determining the overvoltage factor for each failure scenario of the particular capacitor bank arrangement using only nameplate capacitor bank data (i.e. arrangement data). The protection element threshold may then be calculated using the overvoltage factor together with select capacitor bank arrangement data. An alarm threshold may be determined for an overvoltage factor calculated with a predetermined number of failed units (e.g. F=1), where that predetermined number is less than the number of failed units corresponding with an overvoltage factor outside of the safe operating range of the capacitor bank. A tripping threshold may be determined for an overvoltage factor corresponding to operation outside of the safe operating range of the capacitor bank. The thresholds may be calculated by an IED from user-entered capacitor bank arrangement data, and then used by the protection elements of the IED.

Following is an example for protection element settings determinations for an ungrounded single-wye capacitor bank in accordance with embodiments described herein. Table 1 includes the capacitor bank data:

TABLE 1

| Ungrounded Single-Wye Capacitor Bank Data | |
|---|---|
| Voltage (line-to-line), kV | 138 |
| Bus Voltage PTR | 1200:1 |
| Bank Nominal Power, MVAr | 7.143 |
| Breaker CTR | 100:5 |
| Units in a Group, P | 14 |

TABLE 1-continued

Ungrounded Single-Wye Capacitor Bank Data

| | |
|---|---|
| Groups in a String, S | 4 |
| Strings in a Phase, R | 1 |
| Unit Voltage Rating, kV | 21.6 |
| Unit Type | Externally Fused |
| Neutral Voltage PTR | 332:1 |

The base units are as follows from Equations 4 and 5:

$$V_{BASE}=79.674\ kV$$

$$I_{BASE}=29.885\ A$$

Equations 11, 12, and 13 may be used for the fail-open scenario (fused bank) to calculate the overvoltage factor $k_{OV}$, failure size F, unbalance protection element 59N operating signal. The unbalance protection function may be set to alarm when a single unit fails (F=1) and to trip when an overvoltage due to unit failures reaches a predetermined unsafe operating threshold (e.g. 110 percent of the unit rating of 21.6 kV).

The nominal voltage across each unit is 138 kV/(√3·4)= 19.918 kV. Therefore, the trip threshold may be calculated using $k_{OV}$=1.1·21.6 kV/19.918 kV=1.192. Accordingly:

$$\text{Alarm Threshold } V_{59N}=0.0063291\ pu$$

$$\text{Trip Threshold } V_{59N}=0.0192\ pu$$

For illustration, the per-unit trip threshold may be converted to secondary units (sec) using base values ($V_{BASE}$, $I_{BASE}$) and transformer ratios (PTR, CTR):

$$V_{59N}=0.0192\ pu\cdot 79.674\ kV/332=4.607\ V\ sec$$

Table 2 provided at the end of this disclosure includes equations for unbalance calculations as described herein for failure scenarios (fail-open, fail-short) for six bank configurations as described herein. For example, Equations 11 and 12 above are included under the ungrounded single-wye configuration for the fail-open scenario.

Figure 6:
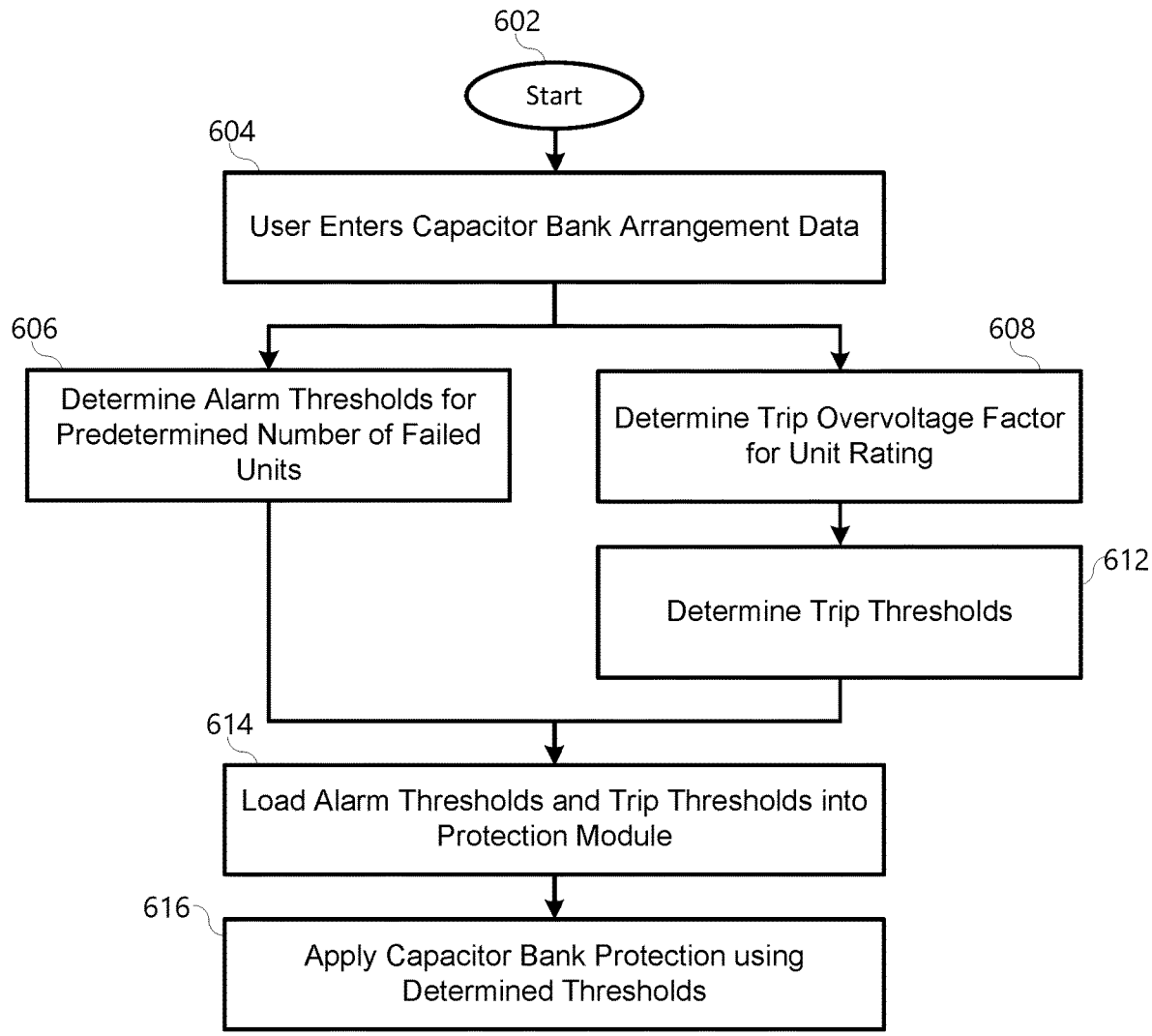
FIG. 6 illustrates a method for determining protection settings for capacitor bank monitoring in accordance with several embodiments herein.

FIG. 6 illustrates steps of a method for calculating unbalance operating signals and thresholds and applying protection using such thresholds in accordance with several embodiments described herein. The method may be performed using stored computer instructions executed on a processing module as illustrated in FIGS. 1 and/or 2. The method starts 602 with a user entering capacitor bank arrangement data into an IED. The arrangement data may include capacitor bank nameplate data. The arrangement data includes the bank configuration, method of fusing, number of parallel capacitor units in a group P, number of series groups in a string S, number of parallel strings (or strings in a phase) R, the capacitor bank unit voltage rating, and the bank nominal voltage reactive power. Additional data regarding the differential tap (87V tap) may be entered if the capacitor bank allows the voltage differential protection.

The computer instructions may use the capacitor bank arrangement data to calculate overvoltage factors and failure sizes in accordance with the embodiments herein and the equations in Table 2. An alarm threshold may be calculated 606 for a predetermined number of failed units. A trip threshold may be calculated 608 based on the highest permissible overvoltage factor. Trip thresholds may be calculated 612 using the trip overvoltage factor. The calculated trip and/or alarm thresholds may be loaded into a protection module 614. The trip and/or alarm thresholds may be used by the protection module to apply the protection element to signals received from the protected equipment. Accordingly, trip and alarm protection element thresholds are calculated and used for capacitor bank protection using only arrangement data of the protected capacitor bank.

In accordance with several embodiments herein, relationships between various protection elements may be used to enhance protection of the capacitor bank. For a series failure in one location, the per-unit operating signals of some unbalance protection elements are identical or proportional to one another. As a result, these protection elements can be considered as redundant elements rather than complementary elements that mutually cover weak spots. Equation 14 describes a relationship between the $V_{59N}$ and $3I_2$ operating signals for any ungrounded bank:

$$V_{59N}=-j\frac{1}{3}\cdot 3I_2 \qquad \text{Eq. 14}$$

Similarly, signals $I_{60P}$ and $3I_2$ for a grounded double-wye bank are related as illustrated in Equation 15:

$$I_{60P}=I_{60N}=3I_2 \qquad \text{Eq. 15}$$

Also, signals $I_{60P}$, $I_{60N}$, and $3I_2$ for an ungrounded double-wye bank are related as illustrated in Equation 16:

$$I_{60P}=3I_2, I_{60N}=\frac{1}{2}\cdot 3I_2 \qquad \text{Eq. 16}$$

Table 2 includes various relationships between operating signals for failure scenarios and capacitor bank arrangements.

The relationship between protection element operating signals allows for cross-checking operating signals before allowing a protection element to operate. Further, if the operating signals are cross-checked before operation, the protection elements may be set with more sensitivity without risking an unintended operation.

Unbalance protection elements are sensitive, and operate on small input quantities (e.g. a fraction of a secondary volt, a fraction of a secondary ampere, etc. . . . ). Such small operating signals may suffer from interference, such as voltages induced in voltage control cables, or currents capacitively coupled from the primary to secondary windings of current transformers, or the like. According to this disclosure, the unbalance protection elements can be set with high sensitivity, and security may be maintained due to cross-checking between operating signals.

In accordance with several embodiments, protection modules may be configured to apply alternative sensitivity procedures depending on whether operating signals exhibit the expected relationships as provided in Table 2. For example, the IED may calculate a difference between unbalance protection operating signals in per unit values for those values that should exhibit the predetermined expected relationship. For example, in an ungrounded single-wye capacitor bank, the $V_{59N}$ and $3I_2$ operating signals should exhibit the relationship described in Equation 14. Therefore, the IED may calculate a blocking signal $V_{BLK}$ as described in Equation 17:

$$V_{BLK}=\left|V_{59N}+j\frac{1}{3}3I_2\right| \qquad \text{Eq. 17}$$

The blocking signal $V_{BLK}$ is small when the two operating signals ($V_{59N}$ and $3I_2$) exhibit the expected relationship and is large otherwise, such as during external faults or due to interference or CT or VT errors.

The IED may calculate a reference signal to determine if the blocking signal is small or large. To continue the previous example, the reference signal $V_{REF}$ may be calculated as described in Equation 18:

$$V_{REF} = \left| V_{59N} - j\frac{1}{3}3I_2 \right| \quad \text{Eq. 18}$$

In general, the blocking signal may be the vectorial sum of the operating signals, and the reference signal is their difference (or vice versa).

The IED may verify the operating signal consistency by comparing the blocking and reference signals and asserting or de-asserting a SECURE bit, as follows:

$$\text{SECURE} = (V_{BLK} < k \cdot V_{REF}) \text{ AND } (V_{REF} > V_{REF0}) \quad \text{Eq. 19}$$

where k is a restraining factor such as 0.10 or 0.20, and $V_{REF0}$ is the minimum signal level supervising the comparison such as, for example, 20 percent of the element trip settings.

When the SECURE bit is asserted, there is a high confidence in the operating signals of the 59N and 50 Q elements, and these elements should be allowed to operate without additional caution. When the SECURE bit is not asserted, there is a low confidence in one or more of the operating signals 59N and 50 Q, and these elements should be allowed to operate with caution.

The additional caution may take several forms. For example, the additional caution may include additional time delay in the order of tens of hundreds of milliseconds to ride through external events and any unbalance and interference they could cause. The additional caution could be temporarily increasing the operating thresholds of the associated unbalance protection elements. The additional caution could be to require yet another unbalance protection element to confirm the internal failure. In various embodiments, that additional protection element should use different CTs and VTs and different control cables.

Accordingly, an expected relationship between the operating signals as described herein may be used to enhance protection. These expected relationships and enhanced protection may be calculated from the user-entered capacitor bank arrangement information. The expected relationships and enhanced protection that has been calculated may be loaded into the protection module and executed in capacitor bank protection in accordance with several embodiments herein.

Furthermore, the expected relationships between operating signals as described above and listed in Table 2 may be used to enhance protection by additional restraining of protection elements that respond to both internal failures and external system failures. This may enhance protection by operating only for internal failures.

For example, the 59N element responds to the neutral-point voltage, which departs from zero during internal and external unbalance in the system. Accordingly, the 59N protection elements may operate for internal and external unbalance conditions. In previous protection schemes, a time delay may be implemented to help distinguish between internal and external disturbances. However, time delays increase exposure to adverse conditions. In accordance with several embodiments herein, however, it may be observed that there is an expected relationship between the $V_{59N}$ operating signal and the $3I_2$ operating signal (depending on the capacitor bank arrangement). See, e.g. Equation 14. This expected relationship may be used to supervise the $V_{59}N$ operating signal with the $3I_2$ operating signal.

In one embodiment, the IED may be configured to restrain with the 3I2 operating signal. Supervision logic may be implemented in accordance with Equations 20 and 21:

$$I_{OPERATE} = -j \cdot 3I_2 \quad \text{Eq. 20}$$

$$V_{POLARIZE} = V_{59N} \quad \text{Eq. 21}$$

The $3I_2$ signal is in phase or out of phase respective to the $V_{59N}$ signal depending on whether the disturbance is internal (in the bank) or external in the power system. The operate and polarize signals may be used in accordance with power system protection directional logic.

Enhancements to protection using expected operating signal relationships for internal and external disturbance may be applied in a number of ways. For example, the $3I_2$ signal can be used in addition to the $3V_0$ signal biasing the scheme for security by providing two independent ways of restraining the element that primarily responds to the $V_{59N}$ voltage. In another example, the $3I_2$ signal can be used instead of the $3V_0$ signal allowing an alternate application without requiring the bus voltage measurement. In yet another example, the $3I_2$ signal can be used instead of the $3V_0$ signal in a fallback mode when the bus VT has problems (loss of potential), which enhances the dependability of protection.

Figure 7:
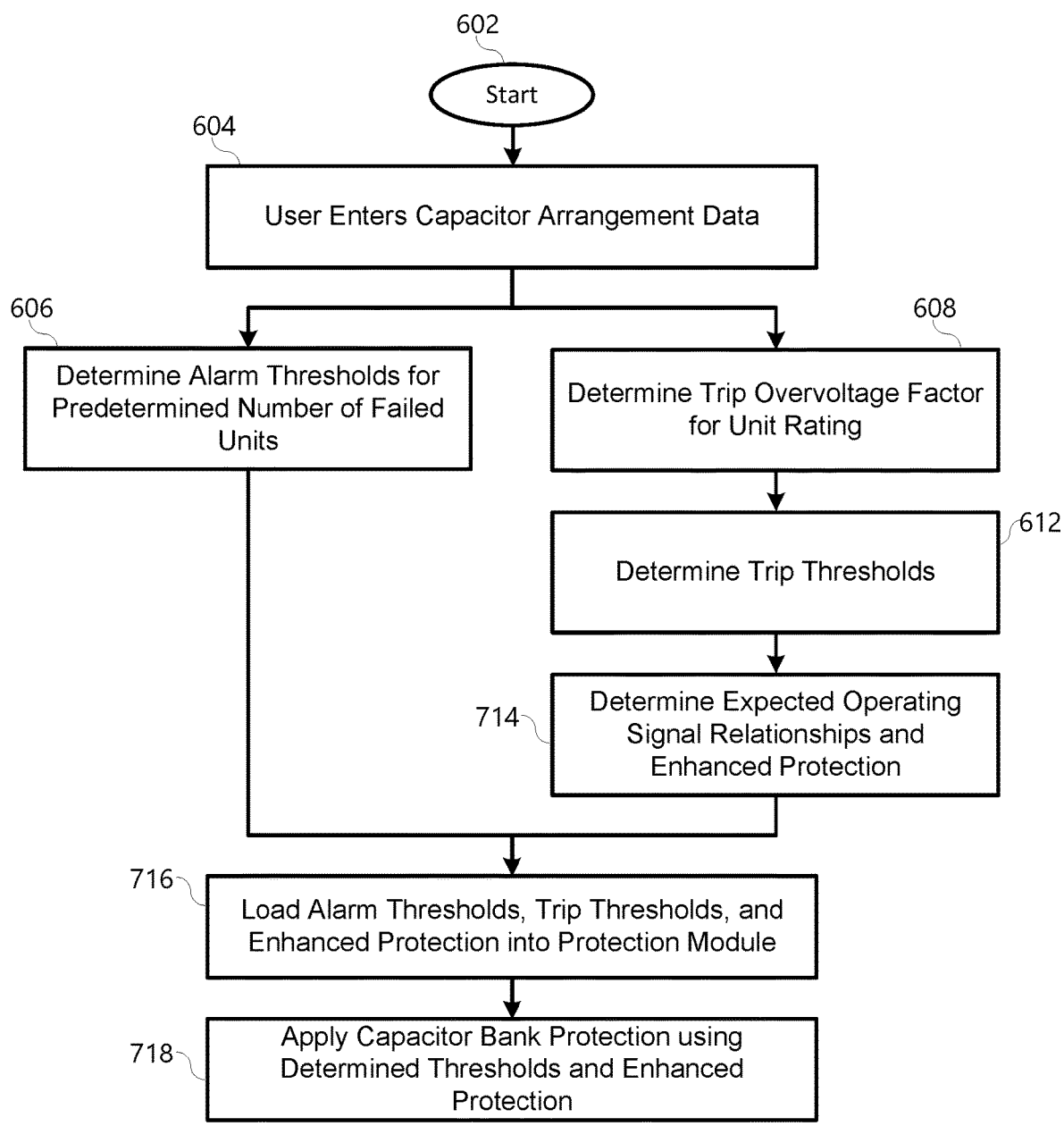
FIG. 7 illustrates a method for determining protection settings and determining related operating signals for capacitor bank monitoring in accordance with several embodiments herein.

Accordingly, protection may be enhanced in accordance with several embodiments described herein using expected relationships between operating signals for the particular capacitor bank arrangement and failure scenario. FIG. 7 illustrates steps of a method for calculating unbalance operating signals and thresholds as well as expected operating signal relationships and applying protection using such thresholds and expected relationships in accordance with several embodiments described herein. The method may be performed using stored computer instructions executed on a processing module as illustrated in FIGS. 1 and/or 2. The method starts 602 with a user entering capacitor bank arrangement data into an IED, and generally follows the steps of FIG. 6 for calculating the overvoltage factor and the trip and alarm thresholds.

The method also determines expected operating signal relationships 714 using the arrangement data. The expected relationships are described in Table 2 for various capacitor bank arrangements and failure scenarios. The method may then determine enhanced protection settings based on the expected relationships between operating signals. The enhanced protection may apply security using the expected relationships between operating signals as described above. The enhanced protection may include distinguishing between internal and external disturbances using expected operating signal relationships as described above.

The calculated thresholds and enhanced protection may be loaded into the protection module 716 and the IED may then provide protection to the capacitor bank using the calculated thresholds and enhanced protection 718.

Table 2 provides equations for the overvoltage factor as a function of the failure size, failure size as a function of overvoltage, and operating signal relationships as functions of both the failure size and the overvoltage for various capacitor bank arrangements the fail-open and fail-short scenarios. The storage media of IEDs described herein may include the data of table 2, such that the equations and relationships described therein may be used to calculate protection settings and thresholds from the nameplate capacitor bank arrangement data entered by a user. Variables used in Table 2 and throughout this specification have the following meanings unless otherwise specified:
P Number of capacitor units in parallel in a group
S Number of groups in a series in a string
R Number of strings in parallel in a phase
F Number of failed capacitor units
T Per-unit tap for the 87V element
H Per-unit position of the bridge in an H-bridge bank

TABLE 2

| Grounded Single-Wye Capacitor Bank | |
|---|---|
| Fail-Open | Fail-Short |
| $k_{OV} = \dfrac{SP}{SP - F(S-1)}$ | $k_{OV} = \dfrac{S}{S - F}$ |
| $F = \dfrac{SP}{S-1} \dfrac{k_{OV} - 1}{k_{OV}}$ | $F = S \dfrac{k_{OV} - 1}{k_{OV}}$ |
| $3I_2 = \dfrac{F}{SRP - F(SR - R)} 1\angle -90°$ | $3I_2 = \dfrac{F}{SR - FR} 1\angle 90°$ |
| $3I_2 = \dfrac{k_{OV} - 1}{R(S-1)} 1\angle -90°$ | $3I_2 = \dfrac{k_{OV} - 1}{R} 1\angle 90°$ |
| $\Delta X_{PHASE} = \dfrac{F}{SRP - F(SR - R + 1)}$ | $\Delta X_{PHASE} = -\dfrac{F}{SR - F(R-1)}$ |
| $\Delta X_{PHASE} = \dfrac{k_{OV} - 1}{R(S-1) + 1 - k_{OV}}$ | $\Delta X_{PHASE} = -\dfrac{k_{OV} - 1}{R + k_{OV} - 1}$ |
| $\Delta X_{STRING} = R \dfrac{F}{SP - FS}$ | $\Delta X_{STRING} = -\dfrac{R}{S} F$ |
| $\Delta X_{STRING} = R \dfrac{k_{OV} - 1}{S - k_{OV}}$ | $\Delta X_{STRING} = -R \dfrac{k_{OV} - 1}{k_{OV}}$ |
| $\Delta V_{87} = \dfrac{TF}{SRP - F\left(SR - \dfrac{R-T}{1-T}\right)} 1\angle 0°$ | $\Delta V_{87} = \dfrac{TF}{SR - F\dfrac{R-T}{1-T}} 1\angle 180°$ |
| $\Delta V_{87} = \dfrac{T(1-T)(k_{OV} - 1)}{R(S-1) - T(SR - (R-1)k_{OV} - 1)} 1\angle 0°$ | $\Delta V_{87} = \dfrac{T(1-T)(k_{OV} - 1)}{R - T((R-1)k_{OV} + 1)} 1\angle 180°$ |

Notes:
All values are in per unit.
$\Delta X_{PHASE}$ and $\Delta X_{STRING}$ are both in per unit of the bank reactance.
Voltage and current phase angles are relative to the faulted-phase voltage.
$\Delta 87V$ differential signal uses bus voltage scaled down to the tap voltage ($V_{TAP} - T \cdot V_{BUS}$).
$T = \dfrac{X_{BOTTOM}}{X_{TOP} + X_{BOTTOM}}$
For nonhomogeneous banks (different unit arrangement below and above the tap), P and R are parameters of the top part and S is an equivalent value, as follows:
$S = \dfrac{S_{TOP}}{1 - T}$

| Ungrounded Single-Wye Capacitor Bank | |
|---|---|
| Fail-Open | Fail-Short |
| $k_{OV} = \dfrac{3SPR}{3SPR - F(3SR - 3R + 1)}$ | $k_{OV} = \dfrac{3SR}{3SR - F(3R - 1)}$ |
| $F = \dfrac{3SPR}{3SR - 3R + 1} \dfrac{k_{OV} - 1}{k_{OV}}$ | $F = \dfrac{3SR}{3R - 1} \dfrac{k_{OV} - 1}{k_{OV}}$ |
| $3I_2 = \dfrac{3F}{3SPR - F(3SR - 3R + 1)} 1\angle -90°$ | $3I_2 = \dfrac{3F}{3SR - F(3R - 1)} 1\angle 90°$ |
| $3I_2 = 3\dfrac{k_{OV} - 1}{3R(S-1) + 1} 1\angle -90°$ | $3I_2 = 3\dfrac{k_{OV} - 1}{3R - 1} 1\angle 90°$ |
| $V_{59N} = \dfrac{F}{3SPR - F(3SR - 3R + 1)} 1\angle 180°$ | $V_{59N} = \dfrac{F}{3SR - F(3R - 1)} 1\angle 0°$ |
| $V_{59N} = \dfrac{k_{OV} - 1}{3R(S-1) + 1} 1\angle 180°$ | $V_{59N} = \dfrac{k_{OV} - 1}{3R - 1} 1\angle 0°$ |
| $V_{59N} = -j\dfrac{1}{3} 3I_2$ | |

TABLE 2-continued

Notes:
All values are in per unit.
Voltage and current phase angles are relative to the faulted-phase voltage.
For internal faults, the 59NU operating signal is the same as the 59N operating signal.

Grounded Double-Wye Capacitor Bank $$I_{60P} = I_{60N} = 3I_2$$

Fail-Open $$k_{OV} = \frac{SP}{SP - F(S-1)} \qquad F = \frac{SP}{S-1}\frac{k_{OV}-1}{k_{OV}}$$

$$3I_2 = \frac{1}{2}\frac{F}{SPR - F(SR - R)}1\angle -90° \qquad 3I_2 = \frac{k_{OV}-1}{2R(S-1)}1\angle -90°$$

$$\Delta X_{PHASE} = \frac{F}{2SRP - F(2SR - 2R + 1)} \qquad \Delta X_{PHASE} = \frac{k_{OV}-1}{2R(S-1)+1-k_{OV}}$$

$$\Delta X_{STRING} = 2R\frac{F}{SP - FS} \qquad \Delta X_{STRING} = 2R\frac{k_{OV}-1}{S - k_{OV}}$$

$$\Delta V_{87} = V_{87} = \frac{TF}{SRP - F\left(SR - \frac{R-T}{1-T}\right)}1\angle 0°$$

$$\Delta V_{87} = V_{87} = \frac{T(1-T)(k_{OV}-1)}{R(S-1) - T(SR - (R-1)k_{OV} - 1)}1\angle 0°$$

Fail-Short $$k_{OV} = \frac{S}{S - F} \qquad F = S\frac{k_{OV}-1}{k_{OV}}$$

$$3I_2 = \frac{1}{2}\frac{F}{SR - FR}1\angle 90° \qquad 3I_2 = \frac{k_{OV}-1}{2R}1\angle 90°$$

$$\Delta X_{PHASE} = -\frac{F}{2SR - F(2R-1)} \qquad \Delta X_{PHASE} = -\frac{k_{OV}-1}{2R + k_{OV} - 1}$$

$$\Delta X_{STRING} = -\frac{2R}{S}F \qquad \Delta X_{STRING} = -2R\frac{k_{OV}-1}{k_{OV}}$$

$$\Delta V_{87} = V_{87} = \frac{TF}{SR - F\frac{R-T}{1-T}}1\angle 180°$$

$$\Delta V_{87} = V_{87} = \frac{T(1-T)(k_{OV}-1)}{R - T((R-1)k_{OV} + 1)}1\angle 180°$$

Notes:
All values are in per unit.
$\Delta X_{PHASE}$ and $\Delta X_{STRING}$ are both in per unit of the bank reactance.
Voltage and current phase angles are relative to the faulted-phase voltage.
$\Delta 87V$ differential signal uses bus voltage scaled down to the tap voltage ($V_{TAP} - T \cdot V_{BUS}$).

$$T = \frac{X_{BOTTOM}}{X_{TOP} + X_{BOTTOM}}$$

For nonhomogeneous banks (different unit arrangement below and above the tap), P and R are parameters of the top part and S is an equivalent value, as follows:

$$S = \frac{S_{TOP}}{1 - T}$$

Ungrounded Double-Wye Capacitor Bank $$I_{60P} = 2I_{60N} = 3I_2 \qquad I_{60N} = \frac{1}{2}3I_2 \qquad V_{59N} = -j\frac{1}{3}3I_2$$

Fail-Open $$k_{OV} = \frac{6SPR}{6SPR - F(6SR - 6R + 1)} \qquad F = \frac{6SPR}{6SR - 6R + 1}\frac{k_{OV}-1}{k_{OV}}$$

$$3I_2 = \frac{3F}{6SPR - F(6SR - 6R + 1)}1\angle -90° \qquad 3I_2 = 3\frac{k_{OV}-1}{6R(S-1)+1}1\angle -90°$$

$$V_{59N} = \frac{F}{6SPR - F(6SR - 6R + 1)}1\angle 180° \qquad V_{59N} = \frac{k_{OV}-1}{6R(S-1)+1}1\angle 180°$$

TABLE 2-continued $$V_{87} = \frac{6TF}{6SRP - F\left(6SR - \frac{6R - 5T - 1}{1 - T}\right)} 1\angle 0°$$

$$V_{87} = \frac{6T(1 - T)(k_{OV} - 1)}{6R(S - 1) - T(6SR - 6(R - 1)k_{OV} - 5) + 1} 1\angle 0°$$

Fail-Short $$k_{OV} = \frac{6SR}{6SR - F(6R - 1)} \qquad F = \frac{6SR}{6R - 1} \frac{k_{OV} - 1}{k_{OV}}$$

$$3I_2 = \frac{3F}{6SR - F(6R - 1)} 1\angle 90 \qquad °3I_2 = 3\frac{k_{OV} - 1}{6R - 1} 1\angle 90°$$

$$V_{59N} = \frac{F}{6SR - F(6R - 1)} 1\angle 0 \qquad °V_{59N} = \frac{k_{OV} - 1}{6R - 1} 1\angle 0°$$

$$V_{87} = \frac{6TF}{6SR - F\frac{6R - 5T - 1}{1 - T}} 1\angle 180°$$

$$V_{87} = \frac{6T(1 - T)(k_{OV} - 1)}{6R - T(6(R - 1)k_{OV} + 5) - 1} 1\angle 180°$$

Notes:
All values are in per unit.
Voltage and current phase angles are relative to the faulted-phase voltage.

$$T = \frac{X_{BOTTOM}}{X_{TOP} + X_{BOTTOM}}$$

For nonhomogeneous banks (different unit arrangement below and above the tap), P and R are parameters of the top part and S is an equivalent value, as follows:

$$S = \frac{S_{TOP}}{1 - T}$$

Grounded H-Bridge Capacitor Bank:

$$I_{60P} = \frac{1}{2G} 3I_2$$

$$1_{60N} = \begin{cases} 2I_{60P} & \text{for failures below the bridge} \\ 0 & \text{for failures above the bridge} \end{cases}$$

Fail-Open $$k_{OV} = \frac{2SPRG}{2SPRG - F(2SRG - 2R + 1 - G)}$$

$$F = \frac{2SPRG}{2SRG - 2R + 1 - G} \frac{k_{OV} - 1}{k_{OV}}$$

$$3I_2 = \frac{GF}{2SPRG - F(2SRG - 2R + 1 - G)} 1\angle -90°$$

$$3I_2 = \frac{G(k_{OV} - 1)}{2SRG - 2R + 1 - G} 1\angle -90°$$

$$\Delta X_{PHASE} = \frac{GF}{2SRPG - F(2SRG - 2R + 1)}$$

$$\Delta X_{PHASE} = \frac{G(k_{OV} - 1)}{2SRG - 2R + 1 - Gk_{OV}}$$

$$\Delta V_{87} = \frac{HGF}{4SRPG - F(4SRG - 4R + 2)} 1\angle 180°$$

$$\Delta V_{87} = \frac{HG(k_{OV} - 1)}{2(2SRG - 2R + 1 - Gk_{OV})} 1\angle 180°$$

$$I_{60P} = \frac{1}{2} \frac{F}{2SPRG - F(2SRG - 2R + 1 - G)} 1\angle -90°$$

$$I_{60P} = \frac{1}{2} \frac{k_{OV} - 1}{2SRG - 2R + 1 - G} 1\angle -90$$

TABLE 2-continued

Fail-Short $$k_{OV} = \frac{2SRG}{2SRG - F(2R - 1 + G)} \qquad F = \frac{2SRG}{2R - 1 + G}\frac{k_{OV} - 1}{k_{OV}}$$

$$3I_2 = \frac{GF}{2SRG - F(2R - 1 + G)}1\angle 90 \qquad °3I_2 = \frac{G(k_{OV} - 1)}{2R - 1 + G}1\angle 90°$$

$$\Delta X_{PHASE} = -\frac{GF}{2SRG - F(2R - 1)} \qquad \Delta X_{PHASE} = -\frac{G(k_{OV} - 1)}{2R + Gk_{OV} - 1}$$

$$\Delta V_{87} = \frac{HGF}{4SRG - F(4R - 2)}1\angle 0 \qquad °\Delta V_{87} = \frac{HG(k_{OV} - 1)}{2(2R + Gk_{OV} - 1)}1\angle 0°$$

$$I_{60P} = \frac{1}{2}\frac{F}{2SRG - F(2R - 1 + G)}1\angle 90 \qquad °I_{60P} = \frac{1}{2}\frac{k_{OV} - 1}{2R - 1 + G}1\angle 90°$$

Notes:
All values are in per unit.
Voltage and current phase angles are relative to the faulted-phase voltage.
H is the per-unit position of the bridge relative to the neutral point.
For failures above the bridge, use $G = 1 - H$. For failures below the bridge, use $G = H$ and add 180° to the phase angle. The 180° angle shift does not apply to $3I_2$ and $\Delta X$.

Ungrounded H-Bridge Capacitor Bank $$I_{60P} = \frac{1}{G}3I_2$$

$$I_{60N} = I_{60P}$$

$$V_{59N} = -j\frac{1}{3}3I_2$$

Fail-Open $$k_{OV} = \frac{6SPRG}{6SPRG - F(6SRG - 6R + 3 - 2G)}$$

$$F = \frac{6SPRG}{6SRG - 6R + 3 - 2G}\frac{k_{OV} - 1}{k_{OV}}$$

$$3I_2 = \frac{3GF}{6SPRG - F(6SRG - 6R + 3 - 2G)}1\angle -90°$$

$$3I_2 = \frac{3G(k_{OV} - 1)}{6SRG - 6R + 3 - 2G}1\angle -90°$$

$$V_{59N} = \frac{GF}{6SPRG - F(6SRG - 6R + 3 - 2G)}1\angle 180°$$

$$V_{59N} = \frac{G(k_{OV} - 1)}{6SRG - 6R + 3 - 2G}1\angle 180°$$

$$I_{60P} = \frac{3F}{6SPRG - F(6SRG - 6R + 3 - 2G)}1\angle -90°$$

$$I_{60P} = \frac{3(k_{OV} - 1)}{6SRG - 6R + 3 - 2G}1\angle -90°$$

Fail-Short $$k_{OV} = \frac{6SRG}{6SRG - F(6R - 3 + 2G)} \qquad F = \frac{6SRG}{6R - 3 + 2G}\frac{k_{OV} - 1}{k_{OV}}$$

$$3I_2 = \frac{3GF}{6SRG - F(6R - 3 + 2G)}1\angle 90 \qquad °3I_2 = \frac{3G(k_{OV} - 1)}{6R - 3 + 2G}1\angle 90°$$

$$V_{59N} = \frac{GF}{6SRG - F(6R - 3 + 2G)}1\angle 0 \qquad °V_{59N} = \frac{G(k_{OV} - 1)}{6R - 3 + 2G}1\angle 0°$$

TABLE 2-continued $$I_{60P} = \frac{3F}{6SRG - F(6R - 3 + 2G)} 1\angle 90° \qquad I_{60P} = \frac{3(k_{OV} - 1)}{6R - 3 + 2G} 1\angle 90°$$

Notes:
All values are in per unit.
Voltage and current phase angles are relative to the faulted-phase voltage.
H is the per-unit position of the bridge relative to the neutral point.
For failures above the bridge, use G = 1 − H. For failures below the bridge, use G = H and add 180° to the phase angle. The 180° angle shift does not apply to 3I$_2$ and ΔX.

While specific embodiments and applications of the disclosure have been illustrated and described, it is to be understood that the disclosure is not limited to the precise configurations and components disclosed herein. Moreover, principles described herein may also be utilized for distance protection and directional overcurrent protection. Accordingly, many changes may be made to the details of the above-described embodiments without departing from the underlying principles of this disclosure. The scope of the present invention should, therefore, be determined only by the following claims.

What is claimed is:

1. A capacitor bank protection system, comprising:
   a data acquisition subsystem in electrical communication with a capacitor bank of an electric power delivery system, to acquire a plurality of current signals and voltage signals;
   a user interface to receive a plurality of capacitor bank attribute data related to the capacitor bank;
   a setting module in communication with the user interface for receiving the capacitor bank attribute data to:
      determine an overvoltage factor using the capacitor bank attribute data including a unit voltage rating and a nominal voltage rating;
      determine a plurality of operating signal thresholds using the overvoltage factor and the capacitor bank attribute data;
      update the capacitor bank protection module with the plurality of operating signal thresholds for use in protection of the capacitor bank; and
   a capacitor bank protection module in communication with the data acquisition subsystem and the setting module to:
      receive the plurality of current signals and voltage signals;
      determine operating signals using signals from the data acquisition subsystem;
      determine a protection action upon a comparison of the operating signals with the operating signal thresholds from the setting module; and
      effect the protective action on the electric power delivery system.

2. The protection system of claim 1, wherein the setting module further:
   determines an expected relationship between two or more operating signals based on an arrangement of the capacitor bank; and
   transmits the relationship to the capacitor bank protection module.

3. The protection system of claim 2, wherein the capacitor bank protection module is further configured to:
   compare the two or more operating signals using the expected relationship between the operating signals to provide cross-checked operating signals; and
   determine the protection action based on the cross-checked operating signals.

4. The protection system of claim 3, wherein the capacitor bank protection module is further configured to determine the protection action by cross checking the two or more operating signals with each other using the expected relationship.

5. The protection system of claim 3, wherein the capacitor bank is further configured to effect the protective action without an additional security when the cross-checked operating signals exhibit the expected relationship.

6. The protection system of claim 3, wherein the expected relationship between the cross-checked operating signals is dependent on a location of a fault.

7. The protection system of claim 6, wherein the protection action is determined based on the expected relationship.

8. The protection system of claim 7, wherein the protection action is determined based on the location of the fault as internal or external.

9. The protection system of claim 8, wherein the protection action is permitted without the additional security for a fault location as internal.

10. The protection system of claim 1, wherein the capacitor bank protection module is further configured to verify an integrity of the data acquisition subsystem by comparing a plurality of the operating signals.

11. The protection system of claim 10, wherein the protection module determines a failure of the data acquisition subsystem when the operating signal or signals associated with the data acquisition subsystem exhibits a difference as compared with other operating signals.

12. A method for capacitor bank protection, comprising:
    receiving a plurality of capacitor bank attribute data;
    determining an overvoltage factor using the capacitor bank attribute data including a unit voltage rating and a nominal voltage rating;
    determining a plurality of operating signal thresholds using the overvoltage factor and the capacitor bank attribute data;
    updating a memory of the capacitor bank protection module with the plurality of operating signal thresholds for use in protection of a capacitor bank;
    acquiring a plurality of current signals and voltage signals associated with a capacitor bank of an electric power delivery system using a data acquisition subsystem;
    determining operating signals using signals acquired by the data acquisition subsystem;
    comparing the operating signals to the operating signal thresholds updated to the memory of the capacitor bank protection module;
    determining a protection action upon the comparison of the operating signals with the operating signal thresholds; and effecting the protective action on the electric power delivery system.

13. The method of claim 12, further comprising:

determining an expected relationship between two or more operating signals based on an arrangement of the capacitor bank; and transmitting the relationship to the memory of the capacitor bank protection module.

14. The method of claim 13, further comprising:

comparing the two or more operating signals using the expected relationship between the two operating signals to provide cross-checked operating signals; and determining the protection action based on the cross-checked operating signals.

15. The method of claim 13, further comprising:

determining the protection action by cross checking the two or more operating signals with each other using the expected relationship.

16. The method of claim 13, further comprising:

effecting the protective action without an additional security when the cross-checked operating signals exhibit the expected relationship.

17. The method of claim 13, wherein the expected relationship between the cross-checked operating signals is dependent on a location of a fault.

18. The method of claim 17, wherein the protection action is determined based on the expected relationship.

19. The method of claim 18, wherein the protection action is determined based on the location of the fault as internal or external.

20. The method of claim 19, wherein the protection action is permitted without the additional security for a fault location as internal.

21. The method of claim 12, further comprising:

verifying integrity of the data acquisition subsystem by comparing a plurality of the operating signals.

22. The method of claim 21, further comprising:

determining a failure of the data acquisition subsystem when the operating signal or signals associated with the data acquisition subsystem exhibits a difference as compared with other operating signals.

* * * * *